United States Patent [19]
Estelle et al.

[11] Patent Number: 5,768,030
[45] Date of Patent: Jun. 16, 1998

[54] COMPACT SMALL FORMAT LENS SYSTEM

[75] Inventors: Lee R. Estelle; Barbara J. Kouthoofd, both of Rochester, N.Y.

[73] Assignee: Eastman Kodak Company, Rochester, N.Y.

[21] Appl. No.: 724,724

[22] Filed: Sep. 30, 1996

[51] Int. Cl.[6] ................................................. G02B 15/177
[52] U.S. Cl. ........................... 359/691; 359/784; 359/787
[58] Field of Search ..................................... 359/691, 689, 359/716, 717, 748, 753, 784, 793, 786, 787, 788, 676, 683, 708

[56] References Cited

U.S. PATENT DOCUMENTS

| | | | |
|---|---|---|---|
| 4,203,653 | 5/1980 | Mori | 350/216 |
| 4,210,388 | 7/1980 | Ikeda | 350/214 |
| 4,493,536 | 1/1985 | Kudo | 350/462 |
| 5,175,649 | 12/1992 | Uzawa | 359/691 |
| 5,381,269 | 1/1995 | Estelle | 359/716 |
| 5,418,649 | 5/1995 | Igarashi | 359/716 |
| 5,436,767 | 7/1995 | Suzuki et al. | 359/716 |
| 5,473,473 | 12/1995 | Estelle et al. | 359/691 |
| 5,475,536 | 12/1995 | Kikutani | 359/717 |
| 5,504,618 | 4/1996 | Hirs et al. | 359/355 |
| 5,508,848 | 4/1996 | Inoue | 359/717 |
| 5,552,936 | 9/1996 | Ohno | 359/691 |
| 5,619,380 | 4/1997 | Ogasawara et al. | 359/717 |

*Primary Examiner*—Frank G. Font
*Assistant Examiner*—Michael P. Stafira
*Attorney, Agent, or Firm*—Svetlana Z. Short

[57] ABSTRACT

A lens system particularly suitable for use in a camera using small format film has two lens units, a front negative power lens unit and a rear positive power lens unit. The rear lens unit has no negative lens elements and includes an aspheric surface and a diffractive surface.

23 Claims, 3 Drawing Sheets

COMPACT SMALL FORMAT LENS SYSTEM

BACKGROUND OF THE INVENTION

1. Field of the Invention

This invention relates to compact, short focal length lens systems. Although not limited thereto, it is particularly suitable to a lens systems for use with digital cameras, or cameras utilizing small format film, for example 8 mm film or video cameras.

2. Description of the Background Art

It is very hard to make and mount lens elements that have an edge thickness of less than 0.8 millimeters. Manufacturers of lens systems often require that the lens elements have an edge thickness of at least one millimeter. That means that a positive lens element often has a center thickness that exceeds one millimeter. In addition, the central thickness of a negative lens element is required to be about one millimeter, or greater, in order to make a negative lens element less fragile and more manufacturable. The edge thickness of a negative lens element is larger than its center thickness. The larger of the two thicknesses (edge or center) usually determines the width of the spatial envelope required by a lens element.

Because of the above requirements, in lens systems with a short focal length, i.e., lens systems where the focal length is between 2 and 15 millimeters, the lens elements comprising such lens systems tend to be very thick relatively to the focal length. The above manufacturability requirements make the design of compact lens systems with short focal lengths and long back focus distance difficult. That is, the above manufacturability requirements work against the compactness requirements. For example, in a lens system with a 5 mm focal length and which needs 4 to 6 lens elements for good aberration correction, the sum of the thicknesses of all of the lens elements which determine the minimum required width of the lens system spatial envelope can easily exceed the focal length of the lens system.

Furthermore, short focal length lens systems often have a very small back focus, which does not provide enough clearance between the last surface of the rearmost lens element and the image surface for either optical or other camera parts. The clearance problem can be solved by using a front lens component with strong negative power, such as the one used in the inverted telephoto lens systems. Inverted telephoto lens systems provide a short focal length and a relatively large back focus distance. They comprise two units of lens elements (also referred to as two groups of lens elements); a front, negative power lens unit; and a rear, positive power lens unit. Invariably, the rear lens unit is rather complicated and has at least one negative power lens element. U.S. Pat. No. 4,203,653 and 4,493,536 provide several embodiments of inverted telephoto lens systems. These lens systems have focal lengths that are smaller than the back focus distance. However, the rear, positive power lens units comprise four lens elements, one of which has negative power. In addition, the embodiments disclosed in U.S. Pat. No. 4,203,653 are designed to have a focal length of unity (i.e. the focal length is equal to 1). These embodiments can not be scaled (either up or down) to a focal length of less than 15 mm, because the center thicknesses and edge thicknesses of the lens elements become too small. This is also the reason why the lens system embodiments disclosed in U.S. Pat. No. 4,493,536 can not be scaled down from 100 mm focal lengths to a focal length of 15 mm or less. Thus, the compactness and the large back focus distance (i.e., the clearance) requirements are at odds with the manufacturability requirements.

U.S. Pat. No. 5,508,848 achieves the desired relatively large back focus distance with a lens system of only two lens elements. However, this lens system suffers from a large amount of axial color aberration and is therefore limited to slow F/# applications (F/11). In addition, the lens system disclosed in this patent cannot be scaled down to a 15 mm or smaller focal length because the lens elements would become too thin.

Other lens systems with negative power front lens units and a positive power rear lens units are also known and have relatively few lens elements. These elements satisfy the above described manufacturability requirements. In addition, they do not have a negative lens element in the rear lens unit. Unfortunately these lens systems also provide essentially no back focus. That is, the back focus distance of these lens systems is either zero, or very close to zero, providing no clearance for optical or other camera parts, such as, for example, a filter, a cover glass, or a focus control mechanism. These lens systems are described in U.S. Pat. No. 5,436,767 and 5,504,618. Because they have essentially no back focus, these lens systems are not usable as objective lenses in cameras.

SUMMARY OF THE INVENTION

It is an object of the present invention to provide a compact, easily manufacturable, short focal length lens with an excellent image quality while achieving a reasonable clearance distance between the rearmost surface and an image plane.

According to the present invention, a lens system includes two units of lens elements, in order from an object side: (i) a front, negative power lens unit; and (ii) a rear, positive power lens unit. The rear positive lens unit accepts light from the negative power lens unit. This rear positive lens unit has a plurality of positive power lens elements, at least one of which has a diffractive surface, and no negative power lens elements. The front, negative power lens unit and the rear, positive power lens unit in combination provide a lens system focal length between 2 and 15 millimeters and a back focus distance between 80% and 120% of the lens system focal length.

According to the preferred embodiment, the lens system satisfies a ratio $0.95 < f1/f2 < 1.7$, where f1 is the focal length of the front, negative power lens unit and f2 is the focal length of the rear, positive power lens unit.

It is an advantage of the present invention that the lens system has edge and center thicknesses of about one millimeter and larger, a focal length between 2 and 15 millimeters and a large clearance distance between the rearmost lens surface and an image plane.

DESCRIPTION OF THE PREFERRED EMBODIMENT

Lens unit description

Figure 1:
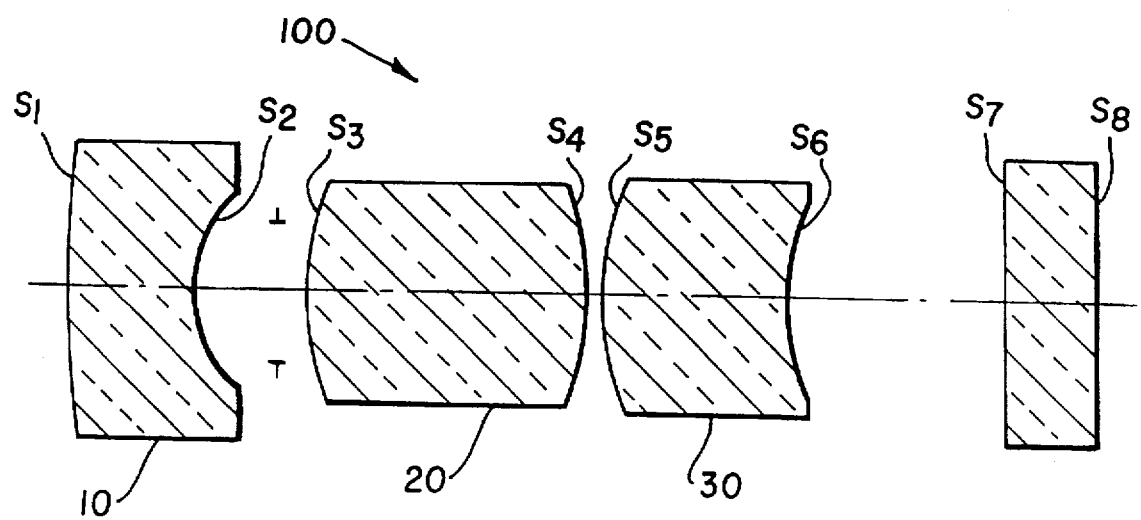
FIG. 1 shows a sectional view of a lens system 100 of a first preferred embodiment of the present invention.

According to a first embodiment of the present invention a lens system 100 comprises three lens components 10, 20 and 30 (FIG. 1) arranged into two lens units of lens elements. The first lens unit U1 comprises lens component 10 and has an overall negative power. The second lens unit U2 comprises two lens components 20 and 30 and has an overall positive power. An aperture stop is located between lens units U1 and U2. It is preferred that the ratio of the lens system's length (front vertex to rear vertex) to the focal length be between 2 and 2.5. In the lens system 100, this ratio is 2.3. The powers of said front and said rear lens units U1 and U2 are being such that the lens system has a focal length between about 2 and 15 millimeters and a back focus between about 80% and 120% of the lens system focal length. It is preferred that in order to provide a reasonable back focus distance, the ratio f1 to f2 be between 0.95 and 1.7, where f1 is the focal length of the front, negative power lens unit U1 and f2 is the focal length of the rear, negative power lens unit U2. It is even more preferred that If the ratio of the two focal length becomes smaller than 0.95 the back focus distance becomes large and the lens system tends to become less compact. If absolute value of the ratio of the two focal length becomes larger than 1.7 the back focus distance becomes too small and the lens system will not have enough clearance space. It is even more preferred that this ratio f1/f2 be between 1.0 and 1.5. In this embodiment f1 is −6.39 mm and f2 is 4.91 mm. The absolute value of the ratio f1/f2 is 1.3. Lens system 100 has a focal length of 6.19 mm and a back focus distance of 5.45 mm. The overall length of the lens system, (measured from the frontmost lens surface to the image plane) is 20.147 mm. Table 1A provides specific parameters for the lens system 100.

Lens component description

Lens components 10, 20 and 30 are described below. The first, divergent lens component 10 has negative optical power and is a single, meniscus glass lens element. This meniscus lens element has a convex object side surface $S_1$ and a concave image side surface $S_2$. The surface $S_2$ is stronger than the surface $S_1$. The second, positive power lens component 20 is situated between the first lens component 10 and an image surface. Lens component 20 is made from plastic. Its index Nd is 1.564 and its V-number is 32.8. It has positive optical power and it is a single biconvex lens element. This biconvex lens element has a convex object side surface $S_3$ and a convex image side surface $S_4$.

The surface $S_3$ is an aspheric surface. The surface $S_4$ is a diffractive surface.

The third, positive power lens component 30 is situated between the second lens component 20 and the image surface. Lens component 30 is made from the same plastic. It has positive optical power and it is a meniscus lens element. This meniscus lens element has a convex object side surface $S_5$ and a concave image side surface $S_4$. Surface $S_6$ is aspheric.

It is noted that other optical materials, glass or plastic, can be used in making lens components 20 and 30. As discussed above, according to the present invention, one of the surfaces of the lens system is diffractive. More specifically, in the preferred embodiment, the surface $S_4$ of the lens component 20 is a diffractive surface having zone structure provided by a plurality of facets.

Description of the diffractive surface

The diffractive surface is described by the following phase modification equation.

$$\phi(r) = \sum_i \frac{2\pi}{\lambda_0} (C_i r^{2i}) =$$

$$\frac{2\pi}{\lambda_0} (C_1 r^2 + C_2 r^4 + C_3 r^6 + C_4 r^8 + C_5 r^{10} + C_6 r^{12} \ldots)$$

where $\phi(r)$ is the phase modification introduced by a diffractive surface into a light wavefront passing through the diffractive surface, r is the height from the optical axis on the diffractive surface of the lens component and $C_1$, $C_2$, $C_3$, etc. are coefficients defining the diffractive surface. This is the first order diffractive surface. For this embodiment $\lambda_0$=546 mm.

According to one aspect of the present invention, it is preferred that a diffractive surface be the internal surface of the lens system. This placement minimizes light scatter. In particular, this placement minimizes scatter problems resulting from off-axis originated white light scattering of the manufacturing imperfections on the facets. In addition, it keeps the diffractive surfaces free of finger prints and scratches which jeopardize the image quality. In the preferred embodiment, the diffractive surface is placed on the second lens component in order to facilitate axial color correction. It is noted that in other embodiments of the present invention the diffractive surface may be a surface other than the surface $S_4$. It is preferred that the diffractive surface of the positive lens component is defined by the phase modification equation in which the first coefficient $C_1$ is negative. In this embodiment the value for the coefficients $C_1$ is approximately −6.9E-03.

In the lens system 100 the frontmost and the rearmost lens surfaces balance lateral color, while the diffractive surface minimizes axial color. The front negative power lens component 10 bends off-axis rays more than the positive power lens component 20 and has less opportunity to correct axial color before adversely affecting lateral color of the lens system. Thus, according to another feature of the present invention, it is preferred to locate the first diffractive surface on a surface of the first positive power lens component following the negative power lens component 20, in order to better minimize axial color aberration. It is also preferred to make the diffractive surface of the rear lens component 20 in such a way that it adds overall positive power to the lens component 20 making it even more positive. Because no negative lens elements are used in the second lens unit U2 of this lens system, the positive lens components 20 and 30 are not required to have additional (positive) optical power to offset the negative optical power introduced by a negative lens element. This makes the overall lens system compact and simultaneously provides an adequate back focus distance (i.e. a back focus distance that equal about 80% to 120% of the lens system focal length).

Figure 2:
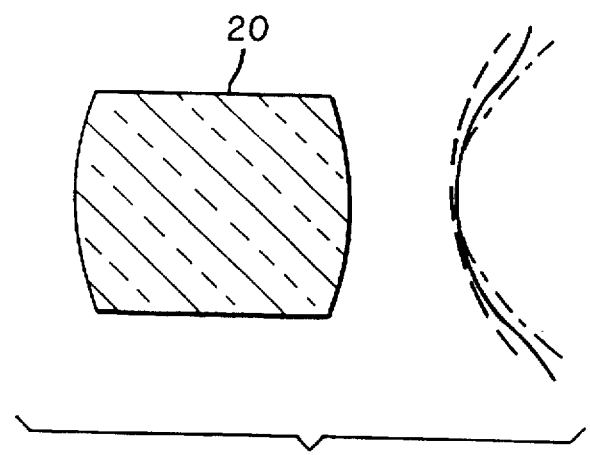
FIG. 2 is a schematic representation of a wavefront emanating from the positive lens component 20 of the lens system illustrated in FIG. 1.

The diffractive surface is designed to put the wavefront forward of the wavefront that would be produced if the diffractive surface was not there. (FIG. 2). It is noted that the diffractive surface can be placed on any of the surfaces of any of the positive lens elements constituting the second lens unit U2. However, it is preferred that the diffractive surface is located on the surface $S_3$, $S_4$ or $S_5$ because then it is less likely to adversely affect lateral color.

As stated above, it is preferred that the first coefficient $C_1$ describing the diffractive surface (of the positive power lens component 20) be negative whether the surface is convex, plano, or concave. The higher order coefficients ($C_2$, $C_3$, etc.) for the diffractive surface are designed to modify the edges of the wavefront emanating out of this lens components 20. These coefficients enable the lens system 100 to have a superior aberration correction. It is preferred that some of the higher order coefficients be positive and some be negative. For this embodiment, the numerical values for the coefficients $C_i$ are provided in Table 1B. The wavefronts emanating out of the lens component 20 are illustrated in FIG. 2. More specifically, FIG. 2 shows schematically with a dash line a propagating spherical wavefront that would be emanating out of the rear surface of the second, positive lens component 20 if this lens component did not have the diffractive surface. It also shows a wavefront (dashed-dotted line) emanating out of the rear surface of the second, positive lens component 20 front that has a diffractive profile represented by the first order term $C_1$ only. A solid line shows the effect on the wavefront when other (higher order) terms are present to define the diffractive surface.

Figure 3A:
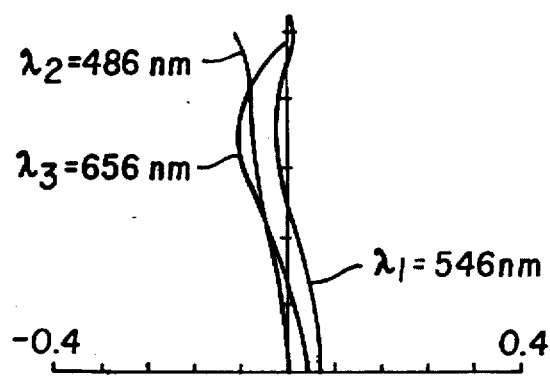
FIGS. 3A–3D are graphical representations of the aberration of the lens system illustrated in FIG. 1.
Figure 3B:
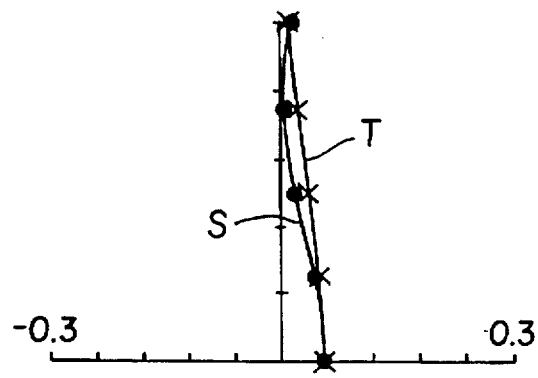
Figure 3C:
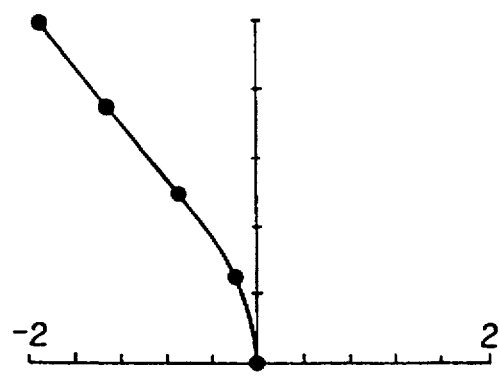
Figure 3D:
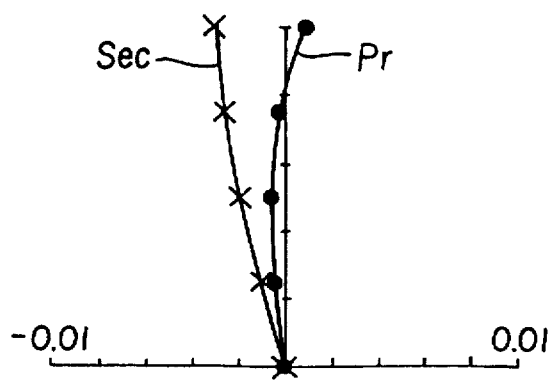

FIGS. 3A–D provide aberration plots for the lens system 100. More specifically, FIG. 3A illustrates longitudinal spherical aberration at the wavelengths, λ1=546 nm, λ2=486 nm and λ3=656 nm. FIG. 3B is a graph of field curvature in sagittal (S) and tangential (T) directions. FIG. 3C is a graph of distortion and FIG. 3D is a graph of lateral color (primary Pr. and secondary Sec.).

As we can see from the aberration curves, the resulting image quality is very high given the small number of lens elements.

TABLE 1A

| Surface | Radius | Thickness | Index N | V number |
|---|---|---|---|---|
| $S_1$ | 27.2137 | 2.5 | 1.487 | 70.4 |
| $S_2$ | 2.7057 | 1.982 | | |
| Ap. stop | | 0.2 | | |
| $S_3$ | Asphere | 5.5 | 1.564 | 32.8 |
| $S_4$ | Diffractive | 0.25 | | |
| $S_5$ | 5.9303 | 3.709 | 1.564 | 32.8 |
| $S_6$ | Asphere | 4.256 | | |
| | Plano | 1.750 | 1.533 | 61.3 |
| | Plano | | | |

Lens length=14.141 mm, F/#=2.2.
Image Distance=0.72

TABLE 1B

Coefficients for the diffractive surface $S_4$ $C_1$ = 6.941 E-03
$C_2$ = 5.005E-04
$C_3$ = 7.3044E-05
R = 1/C = −6.9784
Aspheric Equations $$X = \frac{CY^2}{1+\sqrt{1-(K+1)C^2Y^2}} + ADY^4 + AEY^6 + AFY^8 + AGY^{10}$$

where:

X is the distance along the optical axis OA;

Y is the height from the optical axis;

C is the reciprocal of the vertex radius of curvature of the curved lens surface;

K is the conic coefficient; and

AD through AK are aspheric coefficients of 4th, 6th, 8th and 10th, order. The values of the aspheric coefficients for the two aspheric lens surfaces are provided below.

Surface $S_3$: C=0.152625; AD=0.656E-03; AE=0.82023E-04 R=1/C=6.552.

Surface $S_6$: C=0.14374; AD=0.4846E-02; AE=0.3000E-03; AF=−0.83477E-04; AG=0.91325E-05 R=1/C=6.957.

In the tables and the drawings, the surfaces $S_1$ and the corresponding radii $R_i$ are numbered by subscripts from the front or object side of the lens to the rear or image side of the lens (where the viewer's eye is located). The thickness $T_i$ of the lens elements are also numbered from front to rear. For example, $T_1$ corresponds to the thickness of the first lens element and $T_2$ to the thickness of the second lens element. In the tables, spaces and thicknesses are listed on the same line as the surface preceding the space or thickness, as the case may be. The radii, thicknesses and the spacings provided in the tables are in millimeters.

Other examples

Figure 4:
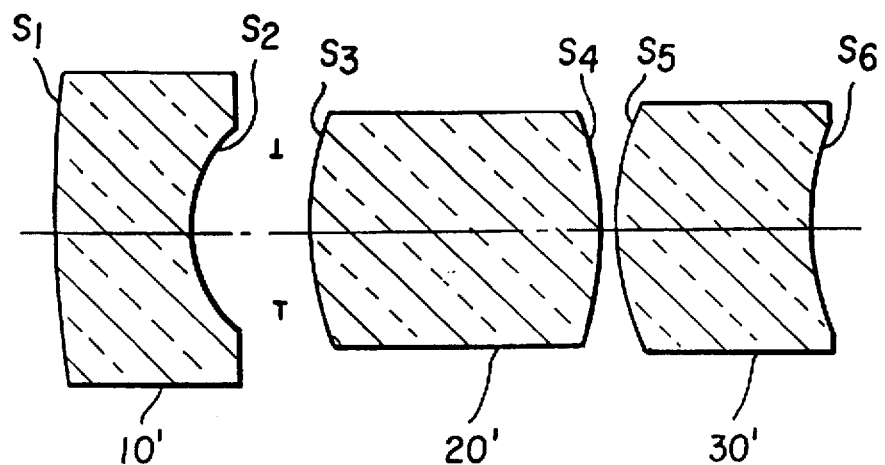
FIG. 4 illustrates another example of the lens system of the present invention.
Figure 5:
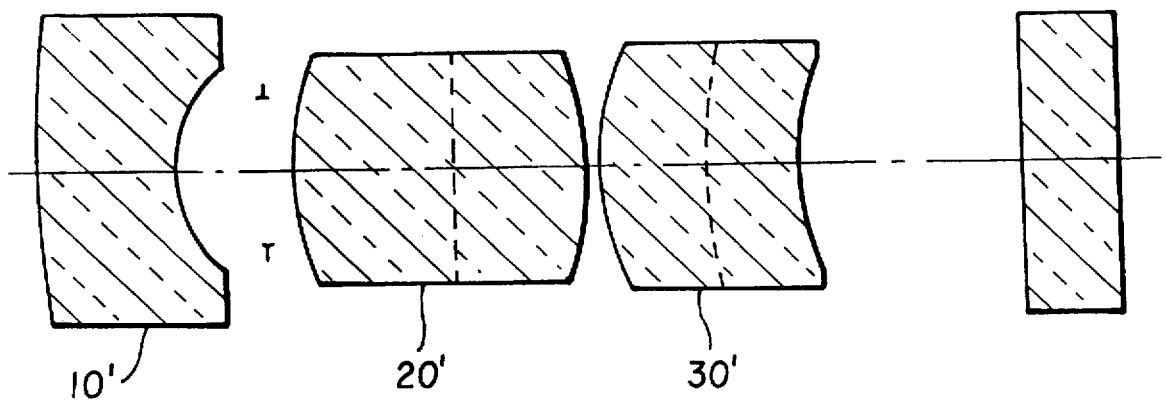
FIG. 5 illustrates yet another example of the lens system of the present invention.

It is noted that the glass plate P located behind the lens system 100 as illustrated in FIG. 1 may not be necessary for some applications. A lens system without a glass plate is illustrated in FIG. 4. This lens system is very similar to the lens system of FIG. 1 and comprises three lens components. They are lens components 10', 20' and 30'. It is also noted that one or more of the thicker lens components may be split into two lens elements by initially keeping the overall power of the two lens elements equal to that of their parent lens component. One possible way of doing so is illustrated by the dashed lines in FIG. 5. Furthermore, the resultant lens elements can be slightly airspaced and the overall lens system may then be re-optimized (to use the fact that the additional surfaces can be used to better control aberrations) in order to improve the lens system performance even further.

It is an advantage of the lens system of the present invention that it is compact, has a short focal length (2 to 15 mm), provides adequate space clearance between the rearmost lens surface and an image surface while providing a superior image quality.

The invention has been described in detail with particular reference to a preferred embodiment thereof, but it will be understood that variations and modifications can be effected within the spirit and scope of the invention.

What is claimed is:

1. A lens system consisting of two lens units of lens elements in order from an object side:

(i) a front, negative power lens unit;

(ii) a rear, positive power lens unit accepting light from said front, negative power lens unit, said rear, positive power lens unit having a plurality of positive power lens elements, at least one of which has a diffractive surface, and no negative power lens elements; and said front, negative power lens unit and said rear, positive power lens unit in combination providing a lens system focal length between 2 and 15 millimeters and a back focus between 80% and 120% of the lens system focal length.

2. A lens system according to claim 1 wherein said lens system has a length and wherein |f1/f2| is between 0.95 and 1.7 and the ratio of said length to the lens system focal length is between 2 and 2.5, where f1 is the focal length of the front, negative power lens unit and f2 is the focal length of the rear, negative power lens unit.

3. A lens system according to claim 1 wherein |f1/f2| is between 1.0 and 1.5 where f1 is the focal length of the front, negative power lens unit and f2 is the focal length of the rear, negative power lens unit.

4. A lens system according to claim 1 further consisting of a glass plate located behind said rear lens unit.

5. A lens system according to claim 1 wherein each one of lens elements of said lens system have (i) edge thickness which is greater than 1 millimeter and (ii) a center thickness that is greater than 1 millimeter.

6. A lens system according to claim 1 wherein said rear lens unit has at least one aspheric surface.

7. A lens system according to claim 1 wherein the lens element with a diffractive surface also has an aspheric surface.

8. A lens system according to claim 1 wherein said rear lens unit comprises 2 lens elements, each of which have at least one aspheric surface.

9. A lens system according to claim 1 wherein said front lens unit is a meniscus lens element convex towards the object side.

10. A lens system consisting in order from an object side:

(i) a front, negative power lens unit;

(ii) an aperture stop;

(iii) a rear, negative power lens unit accepting light from said negative power lens unit, said rear, negative power lens unit having a plurality of positive power lens elements, at least one of which has a diffractive surface, and no negative power lens elements; and said front, negative power lens unit and said rear, positive power lens unit in combination providing a lens system focal length between 2 and 15 millimeters and a back focus between 80% and 120% of the lens system focal length.

11. A lens system consisting in order from an object side:

a first, negative power lens element;

a second, positive power lens element; and a third, positive power lens element, wherein one of said positive power lens elements has a diffractive surface and each one of lens elements of said lens system have (i) edge thickness which is greater than 1 millimeter and (ii) a center thickness that is greater than 1 millimeter.

12. A lens system according to claim 11 wherein said first lens element is glass, said second lens element is plastic, and said third lens element is plastic.

13. A lens system according to claim 11 further consisting an aperture stop between said first, negative power lens unit and said second, positive power lens unit.

14. A lens system according to claim 11 wherein at least one of said positive lens elements has an aspheric surface.

15. A lens system according to claim 11 wherein the lens element with a diffractive surface also has an aspheric surface.

16. A lens system according to claim 11 wherein each of the positive lens elements have at least one aspheric surface.

17. A lens system according to claim 11 wherein said first lens unit is a meniscus lens element convex towards the object side.

18. A lens system according to claim 16 wherein said second lens element is biconvex and said third lens element is a meniscus lens element convex towards the object side.

19. A lens system according to claim 16 wherein the lens system has a focal length between 2 and 15 millimeters and a back focus between 80% and 120% of the lens system focal length.

20. A lens system consisting in order from an object side:

a first, negative power lens element, said first lens element being a meniscus lens element convex towards the object side an aperture stop;

a second, biconvex lens element; and, a third, positive power lens element, said third lens element being a meniscus lens element convex towards the object side, wherein one of said positive power lens elements has a diffractive surface and each one of lens elements of said lens system have (i) edge thickness which is greater than 1 millimeter and (ii) a center thickness that is greater than 1 millimeter.

21. A lens system according to claim 19 further having a glass plate behind said third lens element.

22. A lens system according to claim 1 having an optical axis, wherein said diffractive surface introduces a phase modification $\phi(r)$ into a light wavefront passing through said diffractive surface, wherein $$\phi(r) = \sum_{i=1}^{i=n} \frac{2\pi}{\lambda_0} (C_i r^{2i}), \text{ where}$$

a) r is a height from the optical axis on the diffractive surface of the lens component, b) $\lambda_o$ is a wavelength of light, c) i is an integer from 1 to n, d) $C_i$ is a set of coefficients defining the diffractive surface, and e) $C_1$ is negative.

23. A lens system according to claim 22 wherein at least two of said $C_i$ coefficients are non zero to advance the edges of the outgoing wavefront emanating from said positive lens component with said diffractive surface.

* * * * *